UNITED STATES PATENT OFFICE.

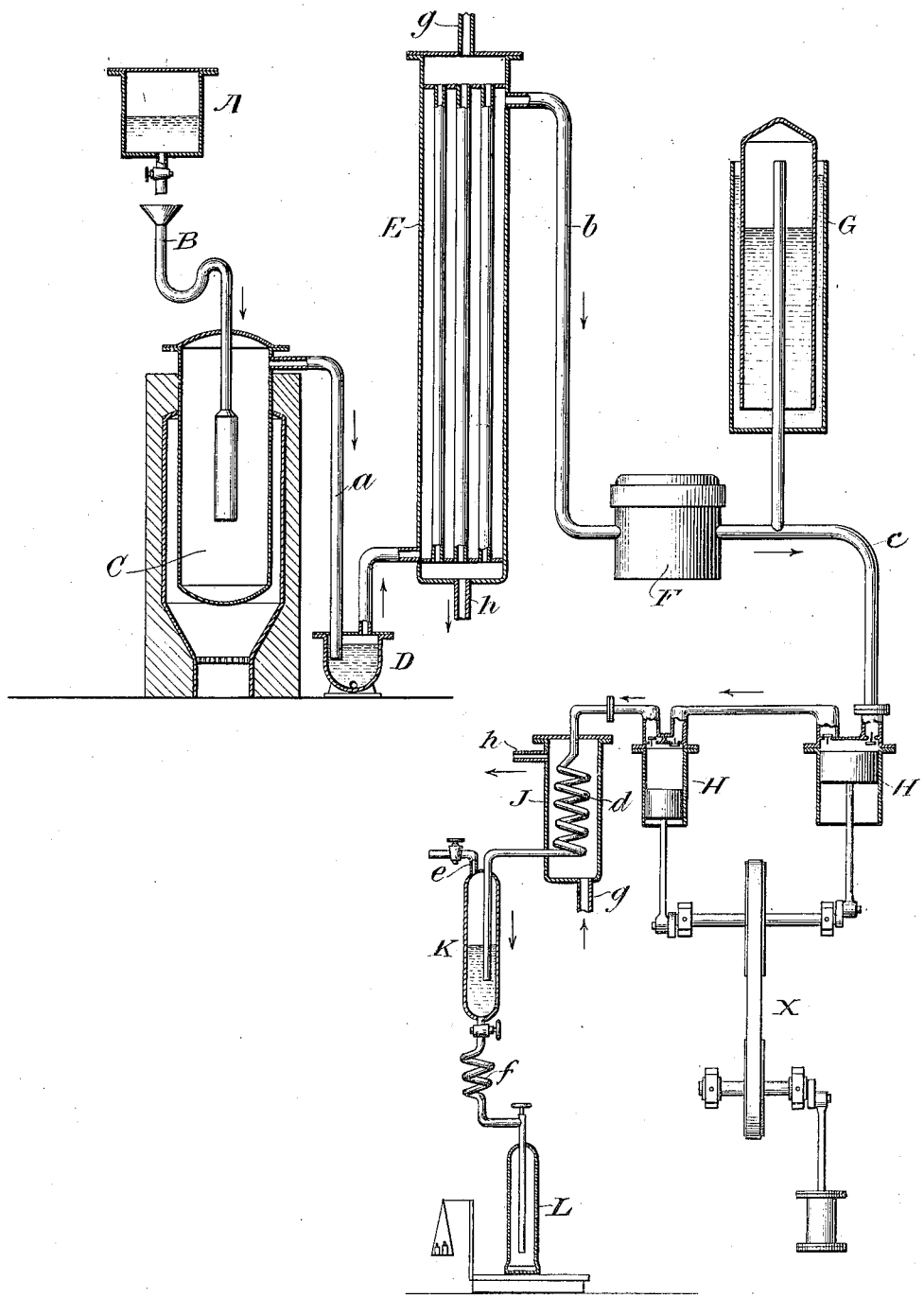

HERMANN BLAU, OF AUGSBURG, GERMANY.

ILLUMINATING LIQUEFIED GAS AND METHOD OF TREATING DISTILLATION GASES TO PRODUCE THE SAME.

No. 862,383. Specification of Letters Patent. Patented Aug. 6, 1907.

Application filed October 31, 1904. Serial No. 230,881.

*To all whom it may concern:*

Be it known that I, HERMANN BLAU, a subject of the German Emperor, and a resident of Augsburg, Germany, have invented a certain new and useful improvement in illuminating liquefied gases and methods of treating distillation gases to produce the same in a highly-compressed form suitable for transport, of which the following is a specification.

This invention has reference to illuminating liquefied gases and to method of treating distillation gases to obtain an illuminating gas in a highly compressed form suitable for transport.

The compressed, liquid, illuminating gas, produced according to this invention, is of such concentration and small volume, compared with its illuminating power, that the cost of transportation thereof, even for great distances, does not materially increase the price of the gas.

In the accompanying drawing, an elevation, forming part of this specification, A is a tank; B an inlet pipe or conduit; C a retort; D a receptacle; *a* a pipe connecting C and D; E a cooler; F a cleaner; *b* a pipe connecting E and F; G a receptacle; HH a compressor; *c* a pipe connecting H with F and G; J a cooler; *d* an outlet pipe from the compressor H which passes in the form of a coil through the cooler J and thence into the vessel K; *e* an outlet pipe for gases from the vessel K; *f* an outlet pipe for liquid gases from the vessel K leading into the container L; *gg* are inlet pipes for water or other cooling substance and *hh* are outlet pipes therefor.

The arrows of the drawing indicate the directions in which the gases and liquids flow.

X is a motor.

Illuminating gas, as is well known, is usually conveyed from the place where it is generated, *i. e.* the gas-works, through a centralized network of pipes laid in an area wherein the individual consumers are congregated more or less densely, as in towns and cities.

For conveyance in closed cylinders or vessels, illuminating gas, in view of its considerable volume, does not in normal circumstances lend itself. In cases where this is done, for example, for the purpose of lighting railway carriages, the gas (oil gas, for instance,) is compressed under a pressure of from 8 to 12 atmospheres into iron cylinders or holders which are made as thin as possible and in which the gas occupies one eighth to one twelfth of its original volume. The gas is supplied to the burners as required through suitable pressure reducing mechanism.

The attempts which have been made by compressing the gas under a pressure of, say, 100 or 150 atmospheres to attain a correspondingly higher concentration of illuminating gas and thereby make its transport to great distance practicable, have hitherto been unsuccessful on account of the fact that by such compression the homogeneity of the mixture of gases of which ordinary illuminating gas consists is lost, inasmuch as the hydrocarbons which are suspended in it in the form of vapor are condensed into a liquid, the quantity of which increases the higher the pressure is raised. Thereby at the same time the combustible and illuminating qualities of the gas are also correspondingly diminished, this, according to the researches made by Pintsch with reference to oil gas, amounting, at a pressure of only ten atmospheres, to from 25 to 44%.

In carbureting apparatus the combustible quality of the gas can of course be restored in a measure after its escape from the cylinder at the pressure at which it is to be used; but the employment of a process of this kind leads to complications which render the advantages offered by a gaseous illuminant, owing to the simplicity and convenience in using it, more or less questionable.

By the process above described the gas is compressed and only those constituents, which, after compression, remain in a gaseous form, are led into suitable cylinders or other containers for use as an illuminating gas, while the constituents turned into a liquid form are discarded. According to this invention the process is the opposite; those constituents of the gas, which, after compression, separate as a liquid, are drawn off, together with those constituents which, as hereinafter described, have been absorbed thereby or dissolved therein, into bottles of steel or other suitable containers for use as an illuminating gas, while the remaining non-liquefied constituents are utilized for any other purpose for which they may be adapted.

The hereinafter described process, which forms the subject-matter of my invention, besides utilizing the capability of the gases to take up or absorb a large quantity of the more volatile hydrocarbons in the form of vapor and thus form therewith a homogeneous gas-mixture, takes advantage also of a property of the oil—particularly that already referred to above—which condenses on compression of the distillation gases. As has been established by experiments, at least those condensed hydrocarbons from distillation gases produced at very low temperature have the power of absorbing under a higher pressure those distillation gases with the exception of a certain excess, chiefly permanent constituents ($CH_4, H_2$), to such an extent that the quantity of gas dissolved or absorbed suffices on escaping from the cylinder at the pressure of the main pipe and the normal temperature to change the heavy hydrocarbons, excepting a small residue of those most difficult to volatilize, into their gaseous form. In this, it must be observed, it is necessary that the mixture of liquefied hydrocarbons be taken from the cylinder in the fluid condition under as near as possible constant pressure and conducted through pressure-reducing devices, whereby the whole of the liquid again passes over into its gaseous state.

The products of distillation obtained at a very low temperature and freed from those constituents which are most difficult to volatilize by cooling, or washing with oil, are in so far the most suitable for our purpose that they, on the one hand, contain a large proportion of fluid hydrocarbon compounds ($C_4H_{10}$ etc.) with a very low boiling point, which after condensation under pressure are capable of dissolving or absorbing a very large volume of gas, and, on the other hand, also contain a considerable proportion of those gaseous hydrocarbons which are most readily soluble in liquid hydrocarbons, so that the production of a mixture having the properties of an illuminating gas in a suitable form for transport is most easily accomplished from such distillation products.

The foregoing description of the present invention will readily be understood by those skilled in the art to which the invention appertains. In further explanation of the invention and in illustration of one form of means whereby the process of the invention may be carried into effect, the following may be added:—

The present invention involves the following three theoretical principles;—

(1). Most, if not all, gases dissolve in liquids and the nearer the gases are, chemically and physically, to the liquids, the greater is the quantity of the gases which may be dissolved in the liquids.

(2). The solubility of a gas in a liquid increases, in a proportional way, with the increase of pressure to which the gas is subjected.

(3). A readily volatile liquid brought into contact with a gas, at atmospherical pressure or at a pressure a little above the atmospherical pressure, from one to two atmospheres, for example, turns into gas or carburets completely, by evaporation, without artificial heating or increasing the temperature, if the volume of the gas is sufficiently great compared to the volume of the liquid.

In the production of a transportable illuminating gas, according to this invention, the foregoing three principles are utilized, as will readily be understood by those skilled in the art, in the manner above described. The effect of the three principles in this invention may, however, be stated as follows:—

(a) A substance mixture is produced of combustible gases and of readily volatile combustible liquids. The liquids are, chemically and physically, closely related to the gases and in the form of vapor are contained in the gases. In other words, a distillation gas of a most high illuminating power is produced, thereby obtaining the primal conditions of the first and third theoretical principles above set forth.

(b) The substance mixture or distillation gas described in the preceding paragraph (a) is compressed, whereby, first, the vaporous substances are separated in a liquid form and gases or gaseous constituents are dissolved in the liquid, in accordance with the first and second theoretical principles above set forth.

(c) In order to dissolve in the liquid so great a volume of the gas, the pressure employed, according to the statement of the preceding paragraph (b), is so high that the liquid of the gases, upon the discharge at atmospherical pressure, or at a pressure which is a little above atmospherical pressure, is again taken up in the form of vapor by carburetization, except a possible, small residue, so that the whole constitutes a homogeneous gas mixture, whereby the third principle is fulfilled.

Under distillation gases are to be understood all gases produced from organical raw material, such as wood, peat, bituminous coal, vegetable and mineral oils, etc. The distillation gases may be produced in any well known manner, as by heating material, such as the raw materials mentioned, under the exclusion of air, in glowing retorts or generators. The main, chemical constituents of the distillation gases, from mineral oils, for example, are, as is well known, beside methane ($CH_4$) and hydrogen ($H_2$), the higher molecular, gaseous, volatile and liquid hydrocarbons of the methane and ethylene groups, such as ethan ($C_2H_6$), propan ($C_3H_8$), butan ($C_4H_{10}$), penta ($C_5H_{12}$), hexan ($C_6H_{14}$), ethylene ($C_2H_4$), propylene ($C_3H_6$), butylene ($C_4H_8$), amylene ($C_5H_{10}$), etc.

According to this invention, the gasification should, contrary to the usual method, and in order to secure the best results, be carried so far that there are thereby produced especially the above mentioned, nearly related higher, molecular, gaseous, volatile and liquid hydrocarbons of the methane and ethylene groups, in a proportional large quantity, thirty to fifty per cent. of the volume, while the quantity of the methane and hydrogen is diminished. The gasification should also take place preferably at very low temperatures, temperatures which, with some raw materials, should start at 450° Celsius and with none should exceed 800° Celsius, whereas, as is well known, for the production of coal gas, temperatures of from 900° to 1200° Celsius are used.

For separating the liquid, illuminating gas from the distillation gases produced and purified as described, pressure of from 100 to 150 atmospheres is entirely sufficient. If, during the gasification process, there is observed a constant temperature, depending upon the kind of raw material and upon the form and proportions of the apparatus, which starts the decomposition with such a low thermal energy that, for example, if rectified petroleum be used, ten per cent. by weight can be obtained in gaseous form, it is possible to lower substantially the pressure and still to obtain a product of the qualities of the liquid, illuminating gas; but a pressure, which is less than twenty-five atmospheres, is not sufficient to obtain the desired practical, useful product, whatever may have been the starting material used for the gasification and however the temperature for it may have been reduced.

Illustrated in the drawing, forming part of this specification, is one form of apparatus or means which may be employed for carrying out the process of this invention. The tank A contains pure petroleum of any origin, which proceeds, through the inlet B, to the retort C, heated from below to the inner temperature of 550°—600° Celsius, and is gasified therein. The gasification products pass out of the retort, by the annexed connecting pipes, a, into the receptacle D, and from there into the cooler E, in which the gases are cooled down, by any artificial cooling, as by water, to — 10° Celsius (10° Celsius below zero) in order to separate all highly boiling and difficulty volatile constituent parts of tar. After that the gas passes to the cleaner F where it is liberated by chemicals, in the well known way, from the detrimental parts ($CO_2$, $H_2S$, CO, CN, etc.) The receptacle G, connected by the outlet pipe system $b$ to F, serves as a balance between the production of gas and the withdrawal thereof by the compressor H, which sucks up the gas and compresses it to 150 atmospheres. The heat, liberated by the compression, is taken off under the cooling action of water in the cooler J, through which the gas passes in a tubular coil. Under the contemporaneous influence of the pressure and cooling action of water, the liquid gas separates and disunites, from the non-liquefied, permanent gases, in the vessel K. The separation goes on in such a way, that, first, the readily volatile hydrocarbons (hexan, heptan, amylene and hexylene, etc.), which are liquid at atmospherical pressure and normal temperature and which in the original substance mixture are suspended in the form of vapor, are separated as a liquid, while, in the further action, the gaseous hydrocarbons (ethan, ethylene, etc) which are chemically and physically related to these liquid hydrocarbons, with a small quantity of the permanent gases, methane and hydrogen, are dissolved in the former, while the principal quantity of the methane and hydrogen is separated in a gaseous form above the liquid. The not liquefied gases are taken off by $e$ for any use, while the liquefied gases are drawn off, through $f$, into suitable vessels L for transport. If the whole contents of L is discharged slowly at atmospheric pressure and atmospheric temperature, there remains sometimes only 0.5% but never more than 10% of liquid residue not turned into gaseous form, which fully complies with the practical demands which we can put upon such a product.

From the foregoing description of the present invention, it will be clear, to those skilled in the art, that variations may be made in details without departing from the main features of the invention.

Obviously the liquefied gas, made in accordance with this invention, can, in the usual manner, as by admixture of air, be employed for the production of a non-luminous flame of great heating power adapted to heat to incandescence Welsbach mantels or other suitable objects and for numerous other purposes.

Having now fully described my said invention, what I claim and desire to secure by Letters-Patent is:—

1. The method of producing illuminating liquefied gases, consisting in liquefying constituents of distillation gases which are capable of being liquefied at a pressure and temperature insufficient to liquefy methane, and dissolving in the liquid constituents constituents which are capable of being dissolved therein, substantially as described.

2. The method of producing illuminating liquefied gases, consisting in liquefying constituents of distillation gases produced at a low temperature which are capable of being liquefied at a pressure and temperature insufficient to liquefy methane, and dissolving in the liquid constituents constituents which are capable of being dissolved therein, substantially as described.

3. The method of producing illuminating liquefied gases, consisting in freeing products of distillation from those constituents thereof which are most difficult to volatilize, then liquefying constituents which are capable of being liquefied at a pressure and temperature insufficient to liquefy methane, and dissolving in the liquid constituents constituents which are capable of being dissolved therein, substantially as described.

4. The method of producing illuminating liquefied gases, consisting in liquefying hydrocarbons of distillation gases capable of being liquefied at a pressure and temperature insufficient to liquefy methane, and under higher pressure than is necessary for the liquefaction of the hydrocarbons causing the liquefied hydrocarbons to absorb distillation gases to such an extent that the gases absorbed thereby will, on suitable reduction of the pressure, change the liquefied hydrocarbons substantially into their gaseous form, substantially as described.

5. The method of producing illuminating liquefied gases, consisting in first obtaining the products of distillation at a low temperature, then liquefying hydrocarbons thereof capable of being liquefied at a pressure and temperature insufficient to liquefy methane, and under higher pressure than is necessary for the liquefaction of the hydrocarbons causing the liquefied hydrocarbons to absorb distillation gases to such an extent that the gases absorbed thereby will, on suitable reduction of the pressure, change the liquefied hydrocarbons substantially into their gaseous form, substantially as described.

6. The method of producing illuminating liquefied gases, consisting in first securing the products of distillation at a low temperature, and then compressing under cooling action constituents thereof, consisting of hydrocarbons capable of being liquefied at a pressure and temperature insufficient to liquefy methane and of distillation gases, until distillation gases are absorbed by the hydrocarbons and the whole reduced to a liquid, substantially as described.

7. An illuminating liquefied gas, consisting of liquefied constituents of distillation gases and of constituents of distillation gases absorbed by the liquefied constituents, substantially as described.

8. An illuminating liquefied gas, consisting of fluid hydrocarbons and gaseous hydrocarbons and distillation gases dissolved therein, substantially as described.

9. An illuminating liquefied gas, free from constituents most difficult to volatilize and consisting of fluid hydrocarbons and distillation gases dissolved therein, substantially as described.

10. An illuminating liquefied gas, consisting of liquefied constituents of distillation gases and of such quantity of constituents of distillation gases absorbed by the liquefied constituents as will suffice on suitable reduction of the pressure to change the liquefied constituents substantially into their gaseous form, substantially as described.

11. An illuminating liquefied gas, free from constituents most difficult to volatilize, and consisting of liquefied constituents of distillation gases and of such quantity of constituents of distillation gases absorbed by the liquefied constituents as will suffice on suitable reduction of the pressure to change the liquefied constituents substantially into their gaseous form, substantially as described.

12. An illuminating liquefied gas, consisting of liquefied constituents of distillation gases produced at a low temperature and of constituents of distillation gases dissolved in the liquefied constituents, substantially as described.

In testimony whereof I have hereunto set my hand in presence of two witnesses.

HERMANN BLAU.

Witnesses:
TH. GRABER.
A. KLEIN.